Feb. 24, 1970          O. J. CONSTANT                3,496,619
       METHOD AND APPARATUS FOR MAKING INNER AND OUTER
                  RACES FOR A ROLLER BEARING
Filed Nov. 14, 1967                           11 Sheets-Sheet 8
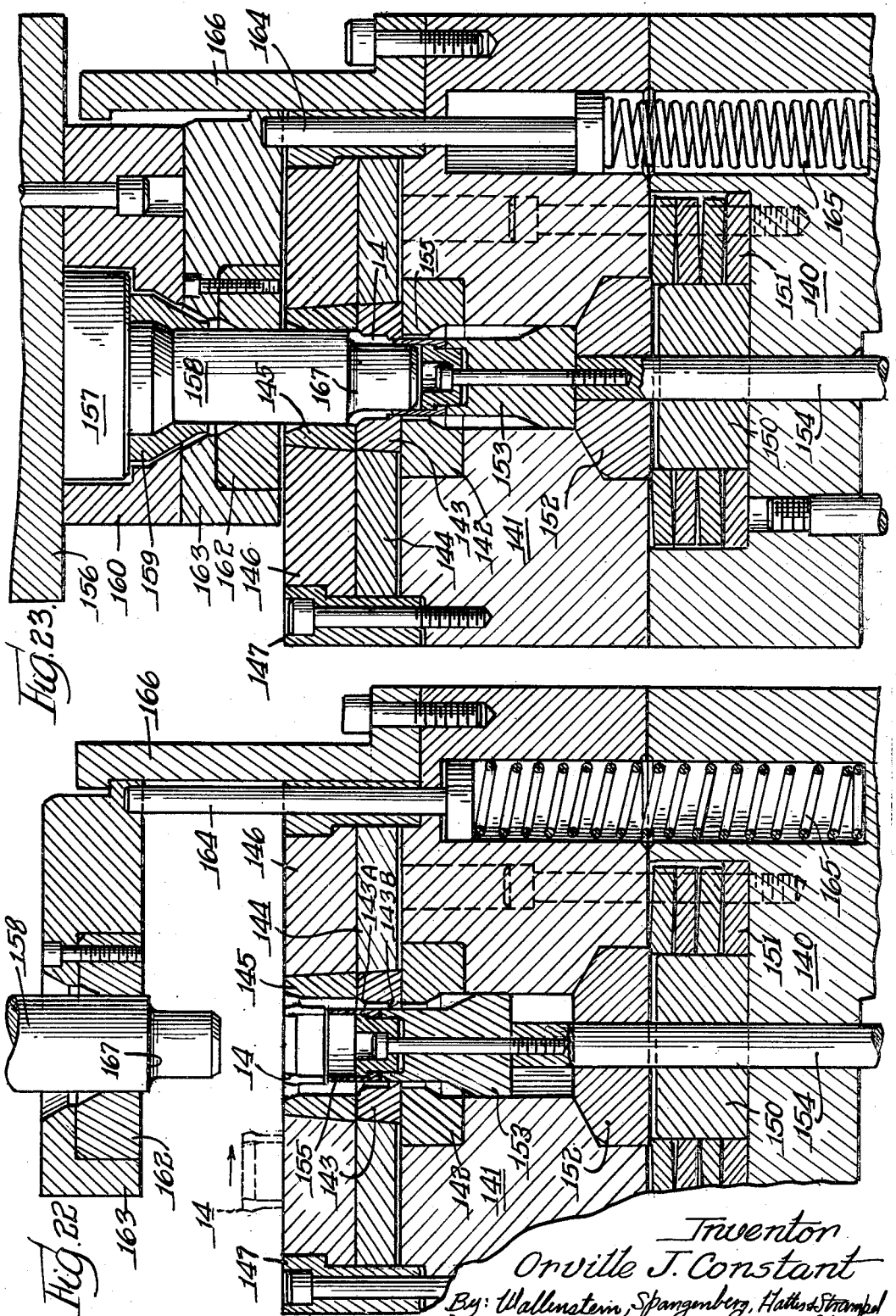
Inventor
Orville J. Constant
By: Wallenstein, Spangenberg, Hattis & Strampel
Attys.

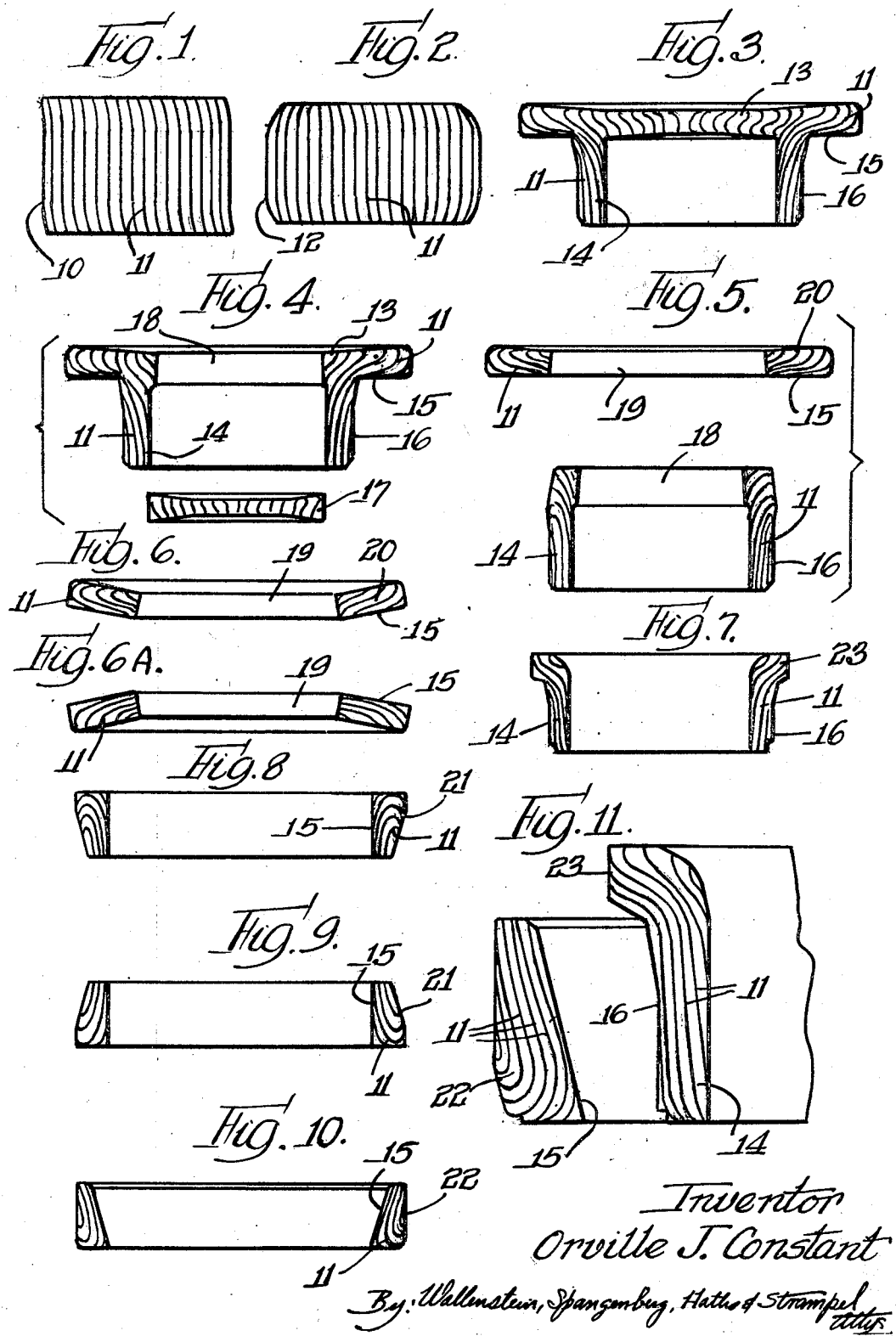

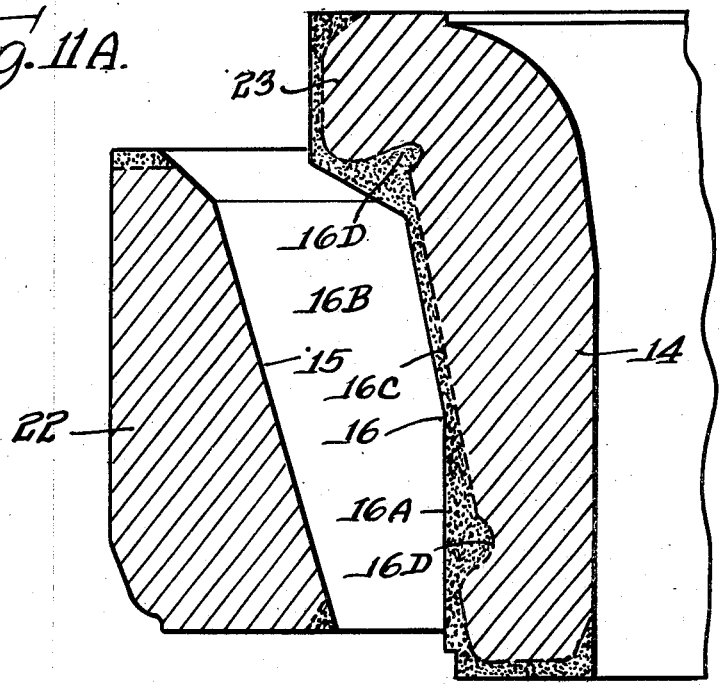
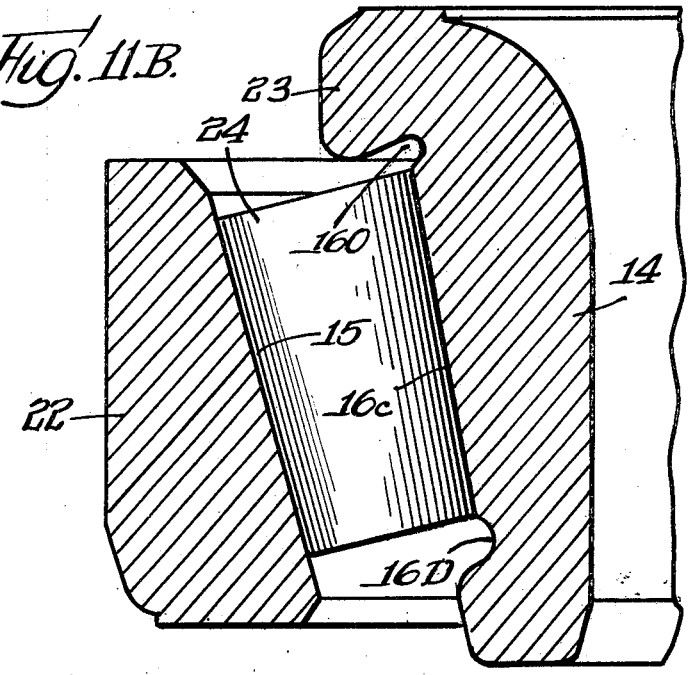

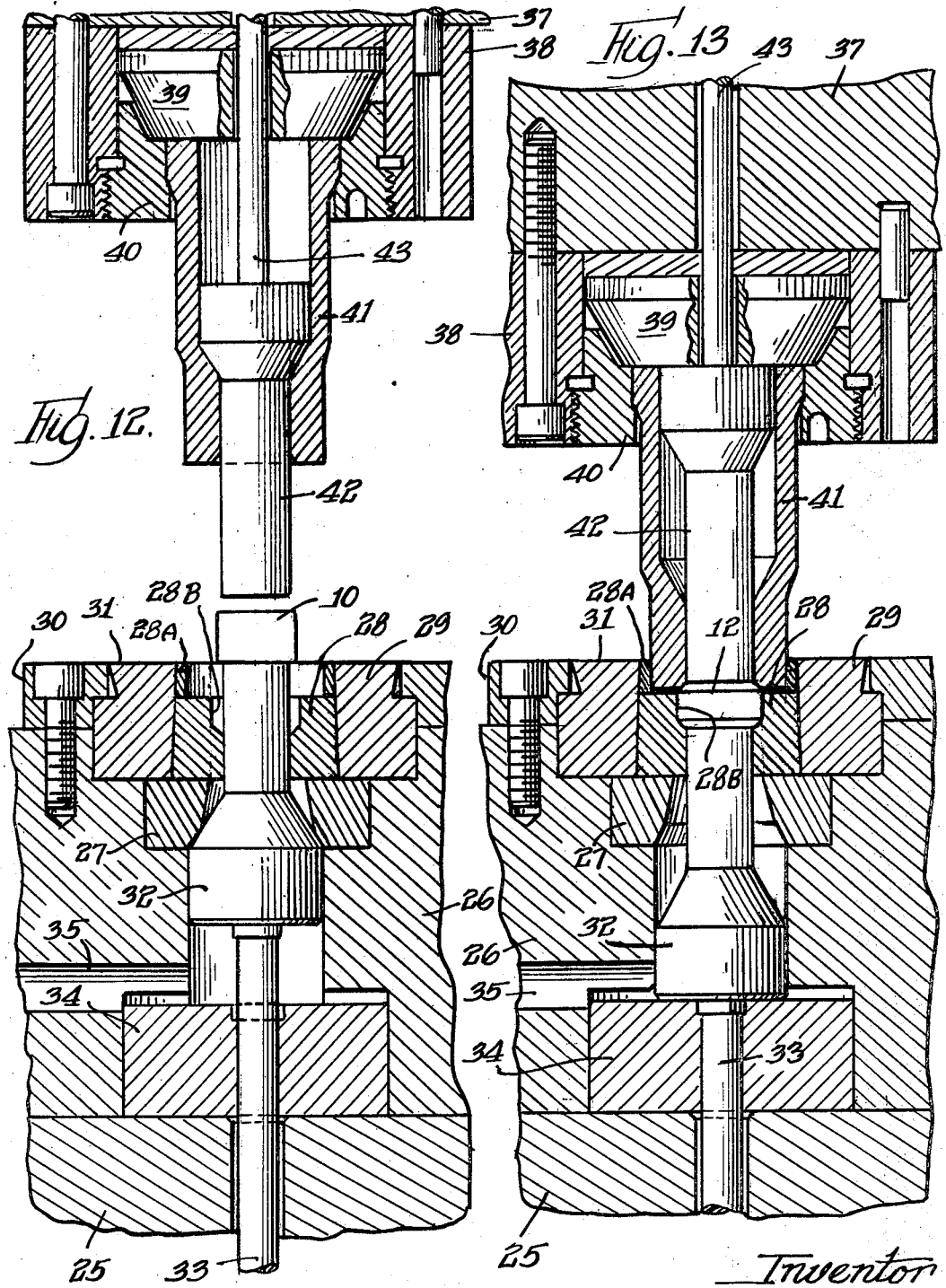

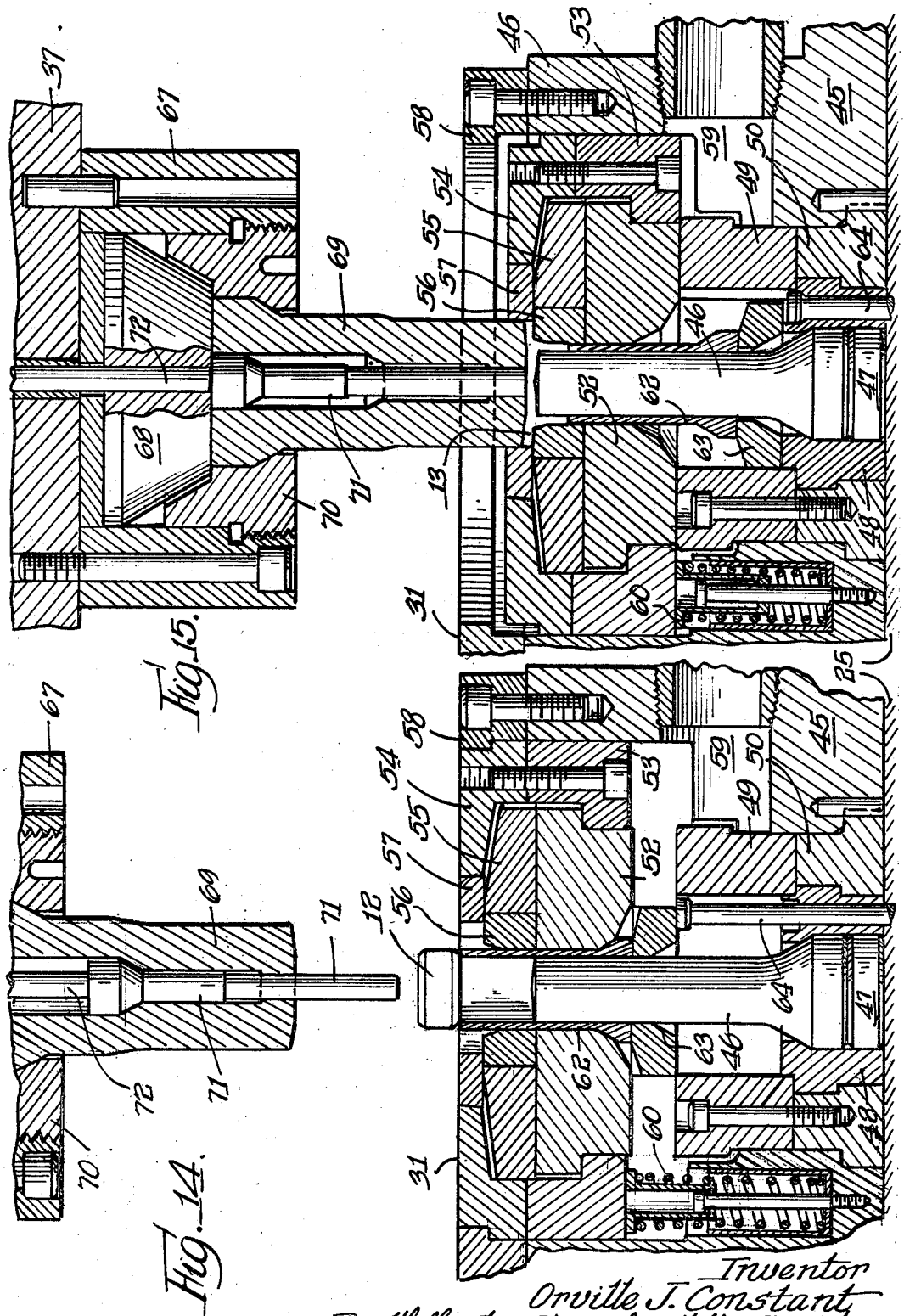

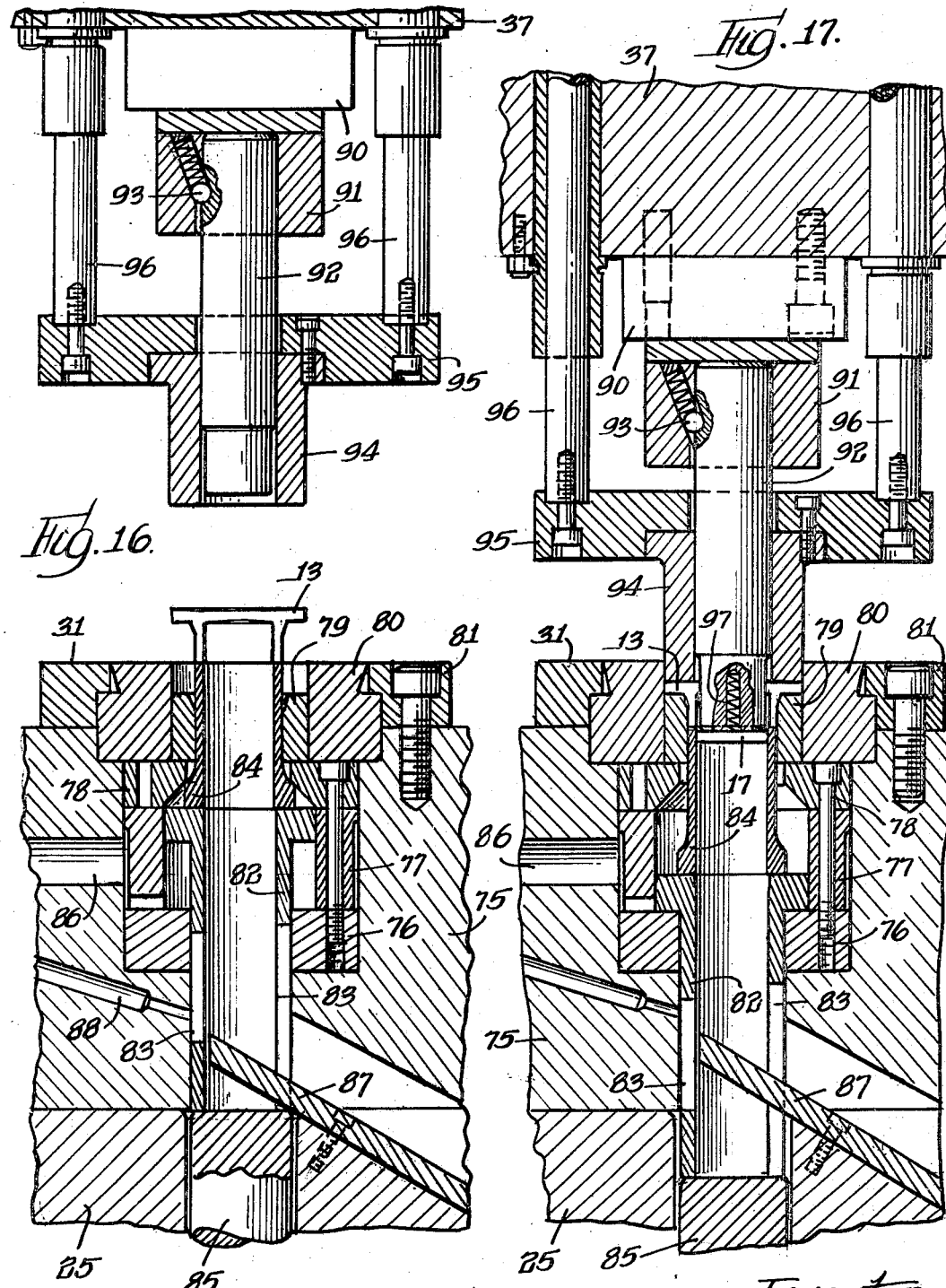

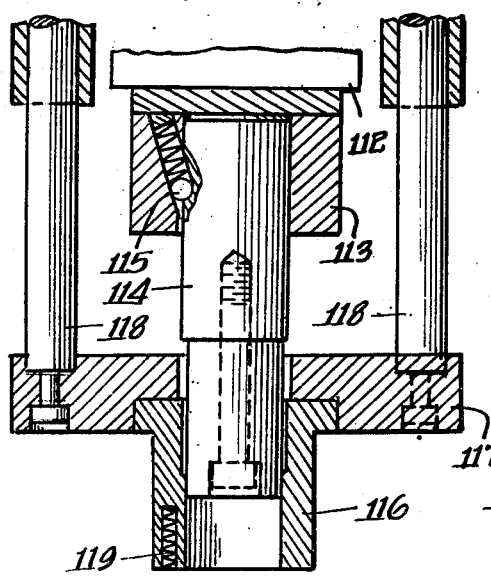
Fig. 18
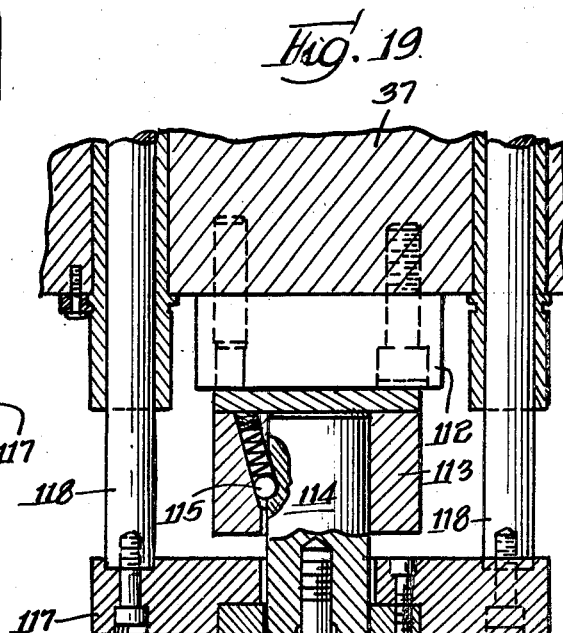
Fig. 19
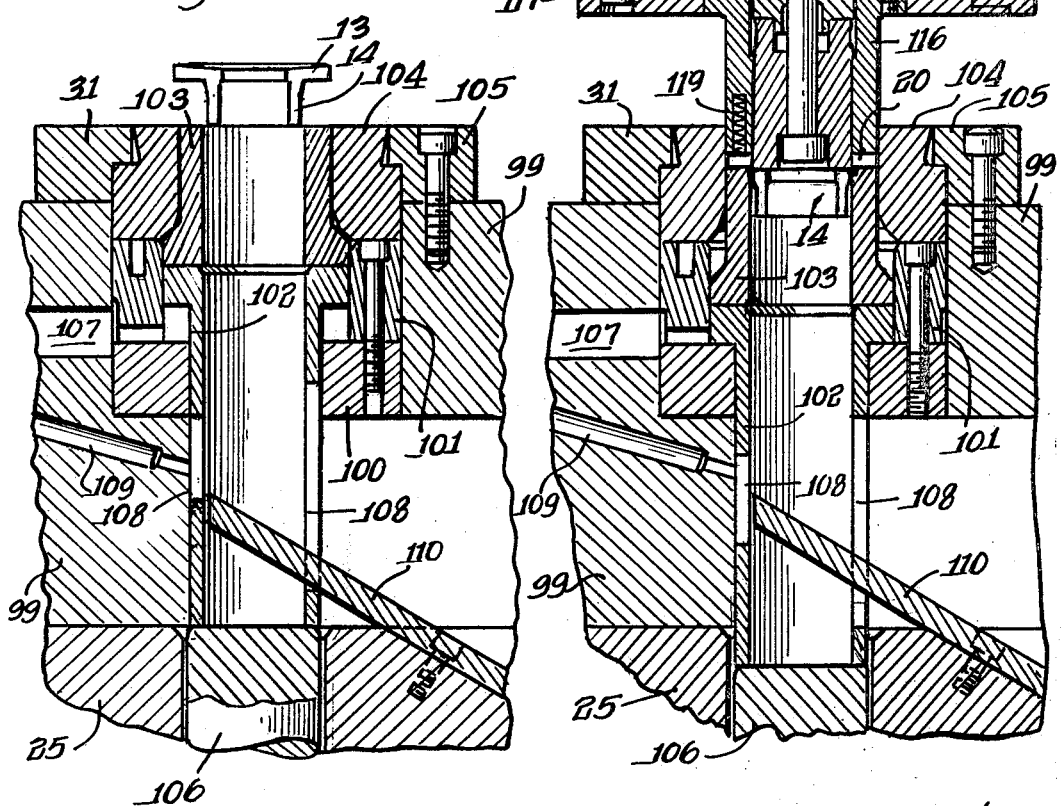
Inventor
Orville J. Constant
By: Wallenstein, Spangenberg, Hattis & Strampel
attys.

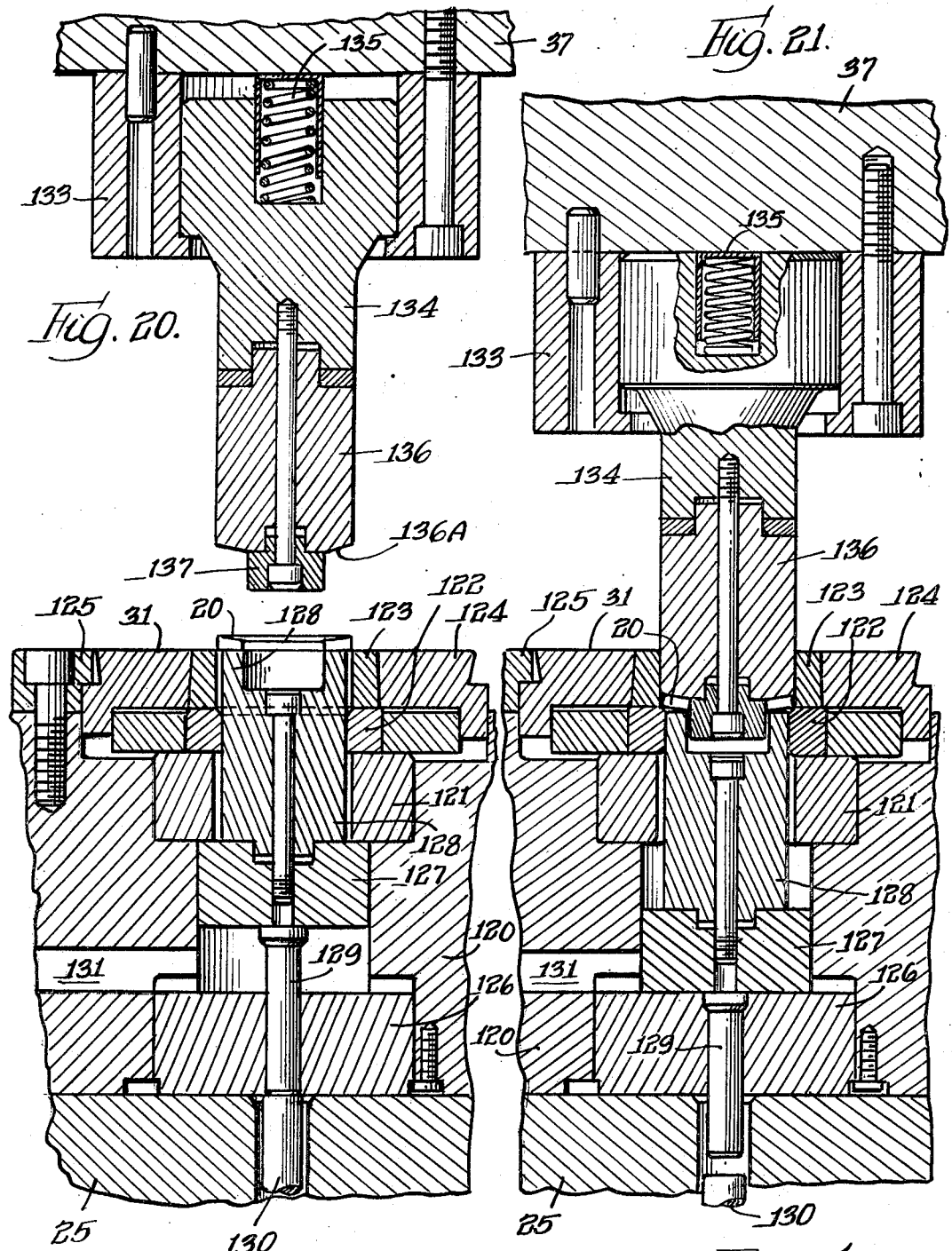

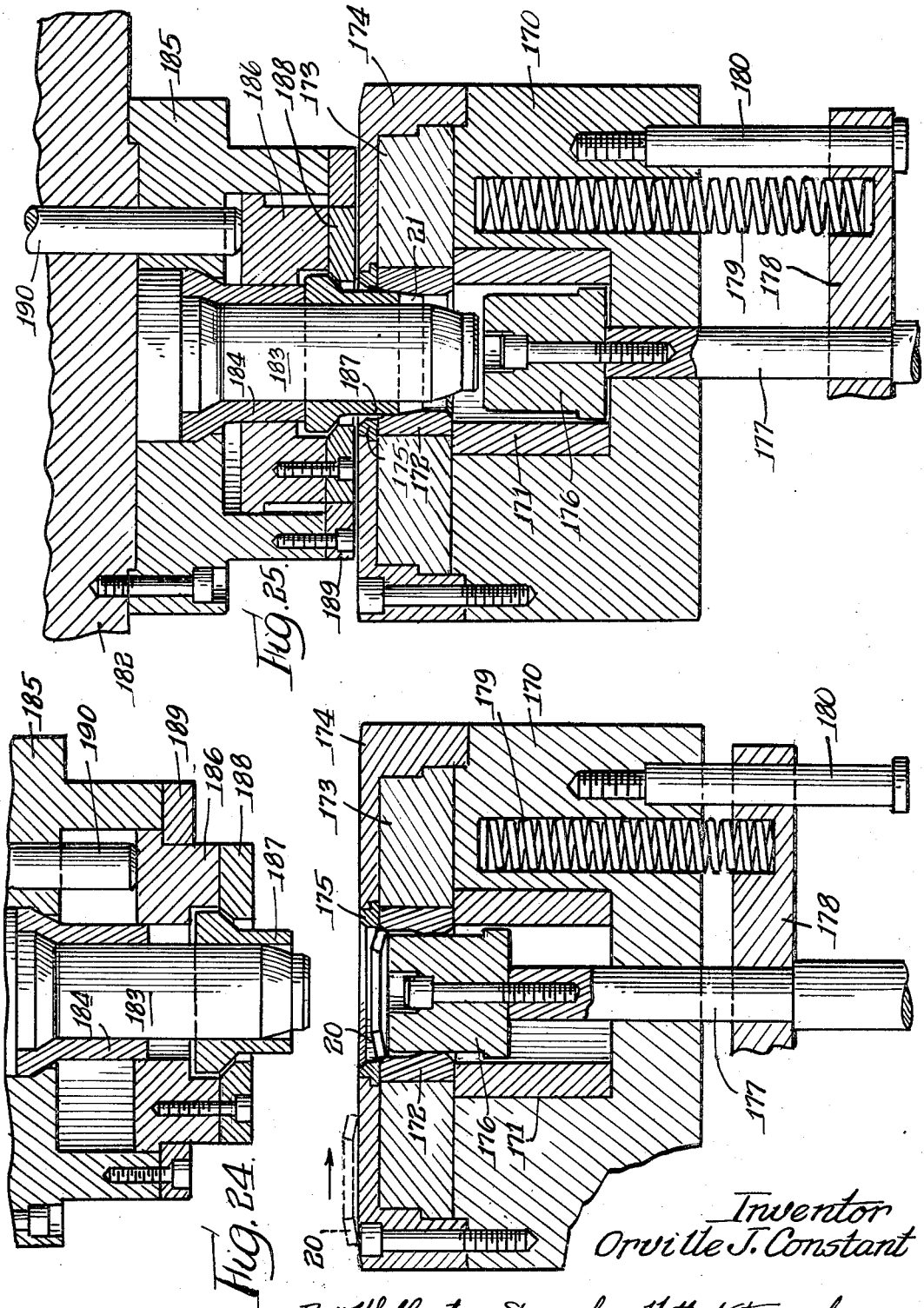

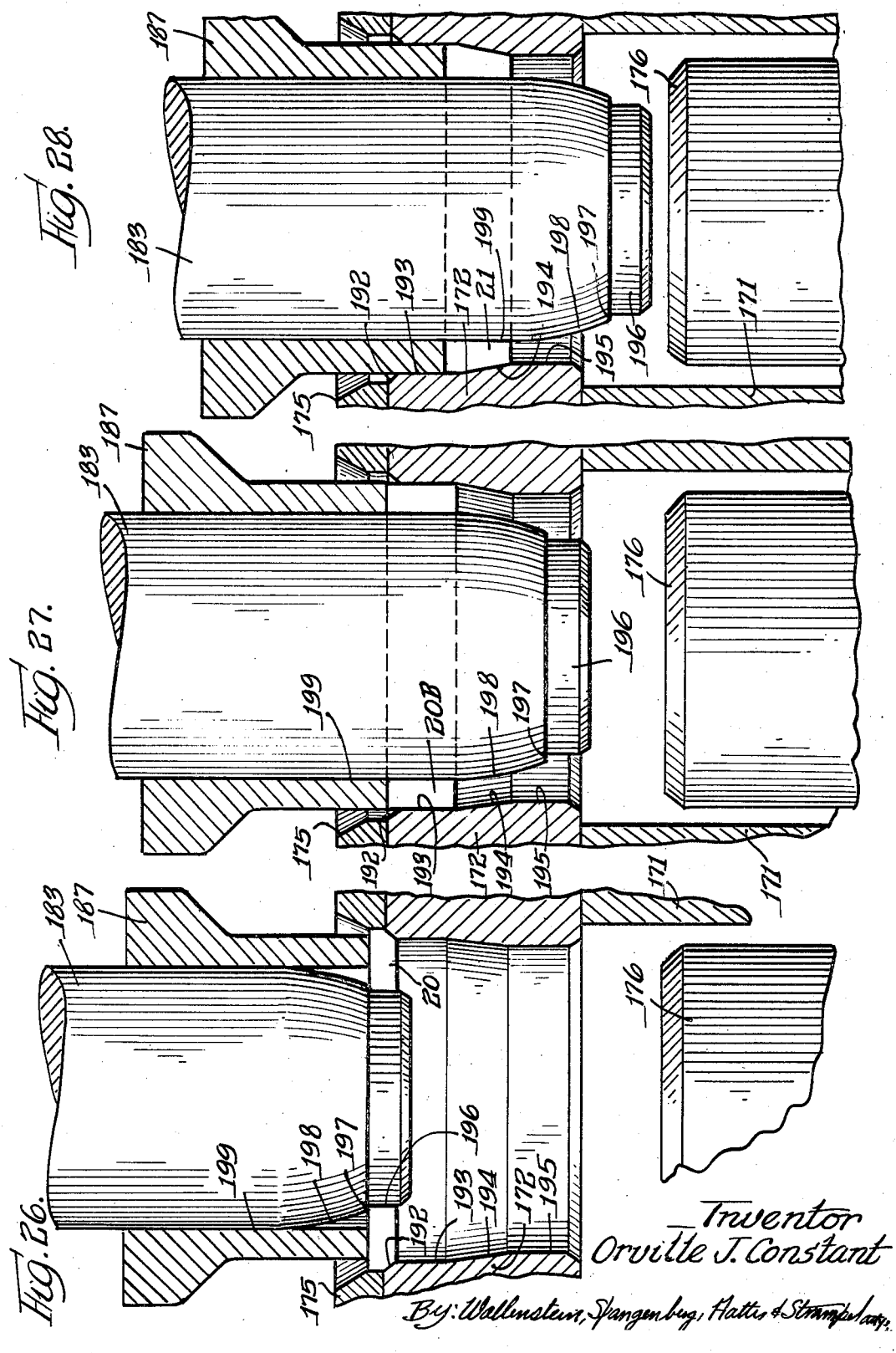

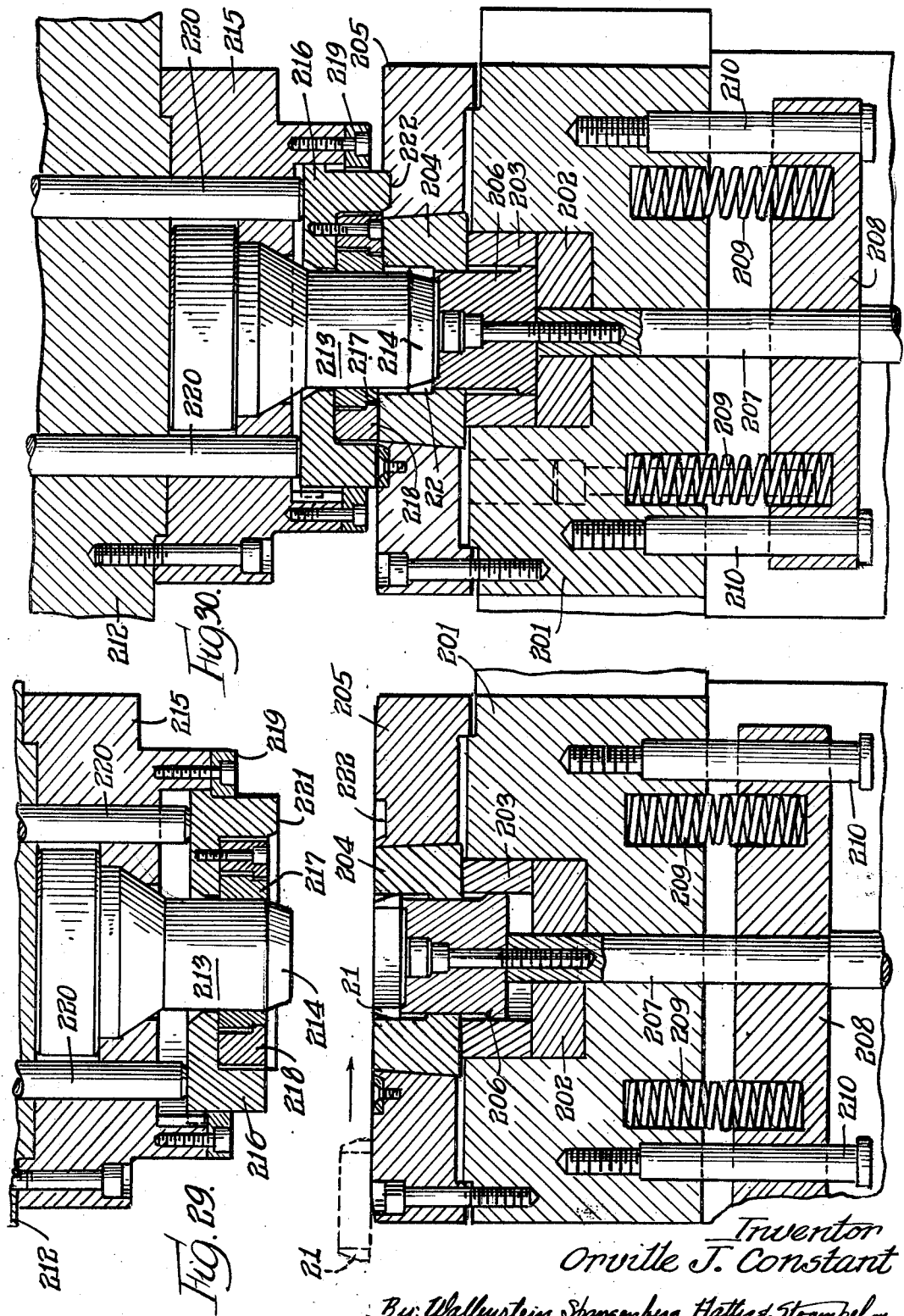

United States Patent Office 3,496,619
Patented Feb. 24, 1970

3,496,619
METHOD AND APPARATUS FOR MAKING INNER AND OUTER RACES FOR A ROLLER BEARING
Orville J. Constant, Hammond, Ind., assignor to Verson Allsteel Press Company, Chicago, Ill., a corporation of Delaware
Filed Nov. 14, 1967, Ser. No. 682,878
Int. Cl. B21k 1/04; B21d 53/12
U.S. Cl. 29—148.4
12 Claims

ABSTRACT OF THE DISCLOSURE

Inner and outer races for a roller bearing are extruded from cylindrical bar stock by pancaking a length of cylindrical bar stock into a circular disc portion having substantially flat sides and having a cylindrical sleeve portion of lesser diameter extending from one of the substantially flat sides thereof, by centrally piercing said circular disc portion and separating said cylindrical sleeve portion from said circular disc portion to form a substantially cylindrical sleeve and a substantially flat annular washer, by extruding the substantially cylindrical sleeve into the inner race for the roller bearing, and by extruding said substantially flat annular washer into the outer race for the roller bearing. In so doing, the grain boundaries of the grain structure of the length of cylindrical bar stock are so controlled and oriented that the grain boundaries of the grain structure of the inner race adjacent the outer surface thereof are substantially parallel to said outer surface and that the grain boundaries of the grain structure of the outer race adjacent the inner surface thereof are substantially parallel to said inner surface, with the result that maximum wearing life of said extruded inner and outer races is provided. The apparatus for so forming the inner and outer races includes means for performing the aforementioned method steps.

---

In accordance with this invention there are provided inner and outer races for a roller bearing which are extruded from bar stock wherein the grain boundaries of the grain structure of the inner race adjacent the outer surface thereof are substantially parallel to said outer surface of the inner race and wherein the grain boundaries of the grain structure of the outer race adjacent the inner surface thereof are substantially parallel to said inner surface of the outer race. Such extruded inner and outer races provide maximum wearing life for the roller bearing. Preferably, the outer surface of the inner race is substantially cylindrical and the inner surface of the outer race is substantially frusto-conical. The substantially cylindrical outer surface of the inner race, which is preferably tapered along a portion thereof, is machined and ground or polished to provide a frusto-conical outer bearing surface, and the frusto-conical inner surface of the outer race, which has a greater taper, is ground or polished to provide a frusto-conical inner bearing surface to accommodate frusto-conical rollers, although this invention is also applicable to roller bearings having cylindrical rollers wherein the inner and outer bearing surfaces of the outer and inner races would both be cylindrical.

A principal object of this invention resides in the method of extruding such inner and outer races for a roller bearing from cylindrical bar stock, this being accomplished principally by suitable die structures in a punch press or the like. Briefly, bar stock having a grain structure including grain boundaries extending longitudinally thereof is utilized and predetermined lengths of such bar stock are sheared therefrom. Such sheared lengths are annealed and coated with a suitable lubricant and they are then each upset and squared by a suitable press operation. Each squared length of the bar stock is then pancaked in a suitable press operation into a circular disc portion having a cylindrical sleeve portion of lesser diameter extending from one side thereof. Then the circular disc portion is centrally pierced and the cylindrical sleeve portion is severed from the circular disc portion by suitable press operations to form a substantially cylindrical sleeve and a substantially annular washer. The foregoing operations may all be accomplished in a single press having suitable transfer mechanisms for advancing the parts from station to station in the press, such as the press and transfer mechanisms disclosed in patent application Ser. No. 682,890, filed Nov. 14, 1967, by George J. Bozich.

The substantially cylindrical sleeves and the substantially annular washers are again annealed and coated with a suitable lubricant prior to the subsequent operations thereon. The substantially cylindrical sleeve is extruded by a suitable press operation into the inner race for the roller bearing, and the substantially annular washer is extruded by suitable press operations into the outer race for the roller bearing. The inner and outer races so extruded have dimensionally accurate and smooth surfaces which require only a minimum of machining, grinding or polishing and there is a very high percentage of material utilization in this process. The inner and outer extruded races are then machined, ground or polished to provide the actual bearing surfaces thereon. The foregoing extrusion processing steps which form the inner and outer races for the roller bearing from the bar stock so control the grain boundaries of the grain structure of the bar stock that the grain boundaries of the grain structure adjacent the bearing surfaces of the inner and outer races are substantially parallel to such bearing surfaces as will be explained more fully hereafter.

A further principal object of this invention resides in the apparatus for extruding such inner and outer races from lengths of bar stock. Here, the apparatus includes suitable die structures operated by suitable presses for performing the extruding operations. Such apparatus provides for accurate, rapid and inexpensive maunfacture of such inner and outer races.

Further objects of this invention reside in the details of the method steps and the cooperative relationships therebetween and in the details of the apparatus and the cooperative relationships between the component parts thereof in the production of the inner and outer roller bearing races of this invention.

In the past, inner and outer races for roller bearings have normally been made by conventional machining or the like and some attempts have been made to form such bearing races by cold extrusion methods. However, in such cold extrusion methods attention has not been given to the proper orientation of the grain boundaries of the grain structure and as a result, long wearing life has not been obtained in such extruded races. As can be seen from the above, applicant's invention is a decided improvement over such prior practices.

Other objects and advantages of this invention will become apparent to those skilled in the art upon reference to the accompanying specification, claims and drawings in which:

FIGS. 1 to 10 illustrate the process steps in producing the inner and outer races for the roller bearing illustrated in FIGS. 11 and 11A.

FIG. 1 is a sectional view illustrating a length of bar stock which has been sheared from bar stock material;

FIG. 2 is a sectional view similar to FIG. 1 but showing the length of bar stock upset and squared;

FIG. 3 is a sectional view showing the squared length of bar stock of FIG. 2 pancaked into a circular disc portion having a cylindrical sleeve portion of lesser diameter extending from one side thereof;

FIG. 4 is a composite sectional view similar to FIG. 3 showing the central piercing of the disc portion of the structure of FIG. 3;

FIG. 5 is a composite sectional view showing the separation of the sleeve portion from the disc portion of the structure of FIG. 4 to provide a substantially annular washer and a substantially cylindrical sleeve;

FIG. 6 is a sectional view similar to the upper part of FIG. 5 but showing the substantially annular washer dished downwardly;

FIG. 6A is a sectional view similar to FIG. 6 but showing the substantially annular dished washer inverted for subsequent forming;

FIG. 7 is a sectional view showing the substantially cylindrical sleeve of the lower part of FIG. 5 extruded into the inner race for the roller bearing;

FIG. 8 is a sectional view showing the substantially annular dished washer of FIG. 6A extruded into a substantially frusto-conical sleeve;

FIG. 9 is a sectional view similar to FIG. 8 but illustrating the substantially frusto-conical sleeve thereof inverted;

FIG. 10 is a sectional view illustrating the inverted frusto-conical sleeve of FIG. 9 extruded into the outer bearing race for the roller bearing;

FIG. 11 is an enlarged partial sectional view of the extruded inner race of FIG. 7 and the extruded outer race of FIG. 10;

The sectional views of FIGS. 1 to 11 have not been cross-hatched so that the grain boundaries of the grain structure of the elements illustrated may be diagrammatically illustrated with clarity.

FIG. 11A is a further enlarged partial sectional view similar to FIG. 11 but illustrating the machining of the inner and outer races to provide the ultimate roller bearing;

FIG. 11B is an enlarged partial sectional view similar to FIG. 11A but illustrating the ultimate roller bearing;

FIGS. 12 and 13 are partial sectional views of a die structure for upsetting and squaring the length of bar stock of FIG. 1 into the work piece of FIG. 2, FIG. 12 illustrating the die construction in open condition and FIG. 13 illustrating the die construction in closed condition;

FIGS. 14 and 15 are partial sectional views of a die structure for pancaking the work piece of FIG. 2 into the pancaked structure of FIG. 3, FIG. 14 illustrating the die structure in open condition and FIG. 15 illustrating the die structure in closed condition;

FIGS. 16 and 17 are partial sectional views of a die structure for piercing the work piece of FIG. 3 are illustrated in FIG. 4, FIG. 16 illustrating the die structure in open condition and FIG. 17 illustrating the die structure in closed condition;

FIGS. 18 and 19 are partial sectional views of the die structure for separating the sleeve portion from the disc portion of FIG. 4 to form the substantially annular washer and the substantially cylindrical sleeve as illustrated in FIG. 5, FIG. 18 illustrating the die structure in open condition and FIG. 19 illustrating the die structure in closed condition;

FIGS. 20 and 21 illustrate the die structure for dishing the substantially annular washer as illustrated in FIG. 6, FIG. 20 illustrating the die structure in open condition and FIG. 21 illustrating the die structure in closed condition;

The aforementioned die structures of FIGS. 12 to 21 may be contained in a single press, the die structures being located at different stations in the press and the work piece being transferred from station to station by a suitable transfer mechanism not shown.

FIGS. 22 and 23 are partial sectional views of a die structure for extruding the inner race of FIG. 7 from the substantially cylindrical sleeve portion of FIG. 5, FIG. 22 illustrating the die structure in open condition and FIG. 23 illustrating the die structure in closed condition;

FIGS. 24 and 25 are partial sectional views illustrating a die structure for extruding the inverted dished annular washer of FIG. 6A into the frusto-conical sleeve of FIG. 8, FIG. 24 illustrating the die structure in open condition and FIG. 25 illustrating the die structure in closed condition;

FIGS. 26, 27 and 28 are enlarged partial views of the die structure of FIGS. 24 and 25 illustrating the progression of the extrusion of the inverted substantially annular dished washer of FIG. 6A into the frusto-conical sleeve of FIG. 8;

FIGS. 29 and 30 are partial sectional views of a die structure for extruding the frusto-conical sleeve of FIG. 9 into the outer race of FIG. 10, FIG. 29 illustrating the die structure in open condition and FIG. 30 illustrating the die structure in closed condition.

The aforementioned die structures of FIGS. 22 to 30 may be contained in separate presses and the work pieces may be automatically fed to the die structures by suitable feeding means not shown.

The cylindrical bar stock from which the inner and outer races for the roller bearing are formed is a rolled bar stock which has the grain boundaries of the grain structure extending longitudinally thereof. As a specific example of the bar stock, it may be hot rolled, rough turned, seam free, round bars of A.I.S.I. 8620 grade steel of bearing quality and having a grain size of about 5 ASTM and a minimum hardness of about 183 B.H.N. and which have been rough turned down to a diameter of 1⅝ diameter. They may be utilized in a pickled and oiled condition.

Predetermined lengths are sheared from the bar stock by a shearing operation, and a predetermined length of such bar stock is illustrated at 10 in FIG. 1. As a specific example, it may have a length of 1.251 inches and a weight of 332 grams. Since the length 10 of bar stock has been sheared from a longer length, the ends thereof may not be completely square and it may be somewhat distorted as shown in FIG. 1. Also, the longitudinally extending grain boundaries 11 of the grain structure may also be distorted somewhat due to the shearing action as illustrated in FIG. 1. In the shearing operation, the length and weight of the sheared lengths 10 of the bar stock are closely controlled to provide ultimate accurate bearing races.

The sheared lengths 10 of the bar stock are then subjected to a first annealing step. As a specific example, they may be heated to 1330° F. plus or minus 15° F. for 5 hours and then cooled to 800° F. at a rate not to exceed 300° F. per hour.

The annealed sheared lengths 10 of the bar stock are then coated with a suitable lubricant to assist in the subsequent forming and extrusion operations. As a specific example, they may be first cleaned to remove grease and oil therefrom by immersing them in a caustic soda alkali bath for a period of 5 to 7 minutes at a temperature of 190° F. to 200° F. and then rinsed in cold water to remove all alkali therefrom and prevent contamination of the next bath. To remove scale and to etch the surfaces thereof the cleaned lengths 10 of the bar stock are immersed and pickled in a 10 to 12% sulfuric acid pickle bath for 7 to 12 minutes at a temperature of 140° F. to 160° F., then rinsed in a cold water rinse and then immersed in a hot water rinse of 170° F. to 180° F. to raise their temperature for faster action in the next bath. The cleaned and etched lengths 10 of the bar stock are then immersed in a Bonderite zinc phosphate containing coating bath at 175° F. to 185° F. for 5 to 7 minutes to provide the same with a zinc phosphate coating, after which they are rinsed in cold water and immersed in a Parcolene neutralizing rinse at 140° F. to 145° F. for 5 to 7 minutes to neutralize any residual acidity and to leave the zinc phosphate coating in an ideal condition for the application of a soap lubricant. Next, they are immersed in a Bonderlube soap containing bath at 140° F. to 145° F. for 5 to 7 minutes, the soap being absorbed into the zinc phosphate coating to form a particularly desirable lubricant layer or coating for the subsequent forming and extrusion operations.

The length 10 of the lubricant coated sheared cylindrical bar stock is fed to the die structure of FIGS. 12 and 13 and is upset and squared into a substantially cylindrical work piece 12 as shown in FIG. 2. Here, the ends of the work piece 12 are made parallel and the circumference thereof is made substantially more cylindrical with the exception of the end portions thereof which are formed inwardly somewhat. The grain boundaries 11 in the work piece 12 are made more uniform and symmetrical by this squaring and forming operation. In the specific example, the height of the work piece is reduced to 1.06 inches and the diameter thereof is increased to 1.942 inches.

The work piece 12 with the longitudinally extending grain boundaries 11 of the grain structure is then transferred from the die structure of FIGS. 12 and 13 to the die structure of FIGS. 14 and 15 where it is pancaked to the shape illustrated in FIG. 3 which includes a circular disc portion 13 and a cylindrical sleeve portion 14 which is of lesser diameter than that of the disc portion and which extends from one side 15 thereof. The outer surface 16 of the cylindrical sleeve portion 14 adjacent the disc portion 13 is provided with a small slope of about 12° as illustrated. It will be noted that the grain boundaries 11 of the grain structure of the disc portion 13 adjacent said one side 15 outwardly from the sleeve portion 14 are substantially parallel to said one side 15, and that the grain boundaries 11 of the grain structure adjacent the outer surface 16 of the sleeve portion 14 are substantially parallel to said outer surface 16. This substantially parallel orientation of the grain boundaries adjacent these surfaces 15 and 16 constitutes an important aspect of this invention. In the specific example, the circular disc portion 13 may have a diameter of 3.056 inches, a thickness of .194 inch, and the cylindrical sleeve portion 14 may have an outer diameter of 1.952 inches, an inner diameter of 1.625 inches and a height of .820 inch.

The pancaked work piece 13 of FIG. 13 is then transferred from the die structure of FIGS. 14 and 15 to the die structure of FIGS. 16 and 17 where the circular disc portion 13 of the work piece is centrally pierced to remove a small disc 17 therefrom to provide a central opening 18 therein within the confines of the cylindrical sleeve portion 14. Due to the piercing operation the central opening 18 has a slight taper as illustrated in FIG. 14. The small disc 17 is discarded and it forms substantially the only waste material in connection with this invention, the diameter of the disc 17 in the specific example being only 1.605 inches. In this piercing operation the outside diameter of the sleeve portion 14 is increased slightly from 1.952 inches to 1.955 inches and the opening 18 has a diameter of 1.605 inches.

The pierced work piece 13 of the upper portion of FIG. 4 is then transferred from the die structure of FIGS. 16 and 17 to the die structure of FIGS. 18 and 19 wherein the sleeve portion 14 is separated from the remainder of the work piece 13 to form a substantially cylindrical sleeve 14 and a substantially annular washer 20 as illustrated in FIG. 5. It is noted that the grain boundaries 11 of the grain structure adjacent the lower outer surface 16 of the substantially cylindrical sleeve 14 are substantially parallel thereto and that the grain boundaries 11 of the grain structure adjacent the bottom side 15 of the substantially annular washer 20 are substantially parallel thereto. In the specific example, the substantially annular washer 20 has an inside diameter of 1.937 inches and the substantially cylindrical sleeve 14 has an overall length of 1.04 inches. The hole 19 in the substantially annular washer and the upper portion of the outer surface of the substantially cylindrical sleeve 14 have a slight taper due to the separating or piercing operation as illustrated in FIG. 5.

The substantially annular washer 20 of the upper portion of FIG. 5 is then removed from the die structure of FIGS. 18 and 19 and is transferred to the die structure of FIGS. 20 and 21 where it is dished downwardly with the aforementioned side 15 thereof on the convex side as illustrated in FIG. 6. The disking of the washer 20 is provided for the purpose of orienting the washer in the subsequent extrusion steps for forming the outer race for the roller bearing. In the specific example, the dishing of the washer 20 may be at about a 10° angle and the outside diameter of the washer 20 is slightly increased from 3.056 inches to 3.060 inches. The grain boundaries 11 of the grain structure of the washer 20 adjacent the convex side 15 of the washer are still substantially parallel to that side.

The dished substantially annular washer 20 of FIG. 6 and the substantially cylindrical sleeve 11 of the bottom portion of FIG. 5, which are formed in the press as described above, are discharged from the press and are again annealed and provided with a lubricant coating. In the specific example, the washers and sleeves may be subjected to a double cycle anneal wherein they are heated to 1550° F. for 1 hour, are cooled to less than 1150° F. at a rate not to exceed 250° F. per hour, are reheated to 1300° F. plus or minus 20° F. and held for 5 hours, are cooled at a rate not to exceed 300° F. per hour to 1,000° F., and are further cooled in an accelerated manner from 1,000° F. to room temperature or handling temperature. This accelerated or fast cooling can be by way of water jacket or the like and is for convenience only, it having no metallurgical significance. Also, the reannealed washers 20 and sleeves 14 are again provided with a lubricant coating, as described above, to assist in the further forming and extrusion of these parts into the outer and inner races for the roller bearing.

The annealed and lubricated substantially cylindrical sleeve 14 of the lower portion of FIG. 5 is then fed to a die structure of a press as illustrated in FIGS. 22 and 23 where it is extruded into the inner race 14 illustrated in FIG. 7. The bottom portion of the inner race 14 has a cylindrical outer surface 16 with the aforementioned small taper and the upper portion thereof is outwardly extruded as indicated at 23. The bottom of the cylindrical outer surface of the inner race may also include an annular recess. It is here noted that the grain boundaries 11 of the grain structure adjacent the outer cylindrical and tapered surface 16 of the inner race 14 are substantially parallel to said outer surface and that the grain boundary ends are substantially concentrated in the outwardly extruded portion 23 of the inner race. In the specific example, the outside diameter of the outwardly extruded portion may be 2.256 inches, the outside diameter of the cylindrical portion 1.934 inches, the inside diameter of the cylindrical portion 1.620 inches, and the total length .82 inch.

The annealed and lubricated substantially annular washer 20 is inverted to position its convex side 15 upwardly, as illustrated in FIG. 6A, and is fed to a die structure of a press as illustrated in FIGS. 24 to 28 wherein it is preformed into a frusto-conical sleeve 21 as illustrated in FIG. 8. The upper convex surface 15 of the annular washer 20 of FIG. 6A forms the inner cylindrical surface 15 of the frusto-conical sleeve 21 of FIG. 8 and it is here noted that the grain boundaries 11 of the grain structure adjacent the inner cylindrical surface 15 of the frusto-conical sleeve 21 are also substantially parallel thereto. In the specific example, the frusto-conical sleeve 21 has an inside diameter of 2.382 inches, an outside diameter of 2.900 inches, an overall length of .580 inch, and an outer taper of 7° throughout most of its length.

The frusto-conical sleeve 21 of FIG. 8 is then inverted as illustrated in FIG. 9 and is fed to a die structure of a press as illustrated in FIGS. 29 and 30 wherein it is extruded into the outer race 22 as illustrated in FIG. 10. The outer surface of the outer race 22 is substantially cylindrical while the inner surface 15 is substantially conical. In other words, the inner cylindrical surface 15 of the frusto-conical sleeve 21 of FIG. 9 is deformed or displaced into the inner conical surface 15 of the outer race 22, it being noted that the grain boundaries of the grain structure adjacent the inner conical surface 15 of the outer bearing race 22 are substantially parallel thereto as illustrated in FIG. 10. In the specific example, the outer bearing race 22 may have an outside diameter 2.906 inches, a maximum inner diameter of 2.675 inches, a minimum inner diameter of 2.371 inches, a length of .594 inch, and an inner conical taper of about 15°22′.

FIG. 11 is an enlarged partial view of the extruded inner race 14 and the extruded outer race 22 arranged in concentric relation. It is seen that the grain boundaries 11 of the grain structure adjacent the inner surface 15 of the outer bearing race 22 and of the grain structure adjacent the outer surface 16 (including the cylindrical and tapered portions thereof) of the inner bearing race 14 are substantially parallel to those surfaces, so that very few, if any, grain boundaries 11 terminate in these surfaces, the grain boundaries 11 generally terminating in other surfaces of the outer and inner races. Such grain structure provides for maximum wearing life for the ultimate roller bearing.

FIG. 11A is a still further enlarged view of the extruded inner and outer races 14 and 22 corresponding to FIG. 11, but eliminating the grain boundaries and illustrating the machining and grinding or polishing required to make the ultimate roller bearing, the stippled portions of FIG. 11A showing the minimum amount of required machining. The outer surafce 16 of the extruded inner race 14, including the cylindrical portion 16A and the tapered portion 16B are machined to provide an outer bearing surface 16C having a taper, in the specific example, of 11°42′. The outer surface of the extruded inner race 14 is also machined to provide recesses 16D at the ends of the tapered or frustoconical surface 16C and the desired configuration therebeyond. The lower end of the inner race 14 may also be machined to provide the exact length of the inner race. The outer race 22 need only be machined adjacent its ends as illustrated. The various surfaces of the inner race 14 and the outer race 22 may be ground and/or polished if desired. By comparing FIG. 11A and FIG. 11, it will be seen that the grain boundaries 11 of the inner and outer races 14 and 22 are substantially parallel to the bearing surfaces 16C and 15, respectively, thereof which provides for maximum wearing life of the roller bearing.

FIG. 11B illustrates the completely machined and ground or polished bearing races 14 and 22 assembled in a roller bearing with rollers 24 interposed between the bearing surfaces 16C and 15 of the bearing races. In the specific example, the bearing surface 16C has a tapered surface of 11°42′ and the bearing surface 15 has an included angle of 30°44′. Inner and outer bearing races of different sizes and shapes can be made in accordance with this invention by utilizing different sizes and weights of the sheared lengths of bar stock and different dimensions for the die structures performing the forming and extruding operations.

As expressed above, the various operations on the work piece as depicted in FIGS. 1 to 6 may be accomplished by a plurality of die structures sequentially arranged at stations in a single press. Such a press may be a conventional mechanical press having a stationary bed provided with a knock-out or ejector mechanism, a mechanically operated ram movably arranged above the bed and provided with pneumatically operated pressure mechanisms, and transfer means for sequentially transferring the work pieces from a feed magazine and from station to station to discharge, such as illustrated in the aforementioned patent application of George J. Bozich.

The die structures arranged at the various stations in the press are illustrated, for example, in FIGS. 12 to 21.

In FIGS. 12 and 13 the die structure includes a carrier member 26 carried by a bolster plate 25 which in turn is carried by the bed of the press for carrying a backing member 27 and a die 28 having an annular extension 28A and a recess 28B having a tapered bottom. A block 29 contains the die 28 and is held in place on the carrier member 26 by a ring 30. The upper surface of the die 28, block 29 and ring 30 form a feed surface 31 along which the work piece 10 is fed by the transfer means. A movable anvil 32 is slidably mounted in the die 28 and carrier member 26 and it is raised to an elevated position as shown in FIG. 12 by a pin 33 operated by the knockout or ejector mechanism in the bed. The anvil 32 may be held in its elevated position by compressed air supplied through the duct 35. When the pin 33 is lowered and the anvil 32 is lowered against the air pressure, the anvil 32 seats upon an anvil block 34 arranged within the carrier 26.

A block 37 carried by the movable ram in turn carries a punch holder 38 which has a punch block 39 secured therein by a threaded retainer 40, the retainer 40 also securing a sleeve 41 in contact with the punch block 39. The sleeve 41 also carries a punch 42 which is normally urged downwardly by a pin 43 operated by the pneumatically operated pressure mechanism in the ram. The sleeve 41 has a tapered recess 41A on its lower end about the punch 42.

With the ram in elevated position a length 10 of bar stock is fed by the transfer means along the transfer surface 31 over the elevated anvil 32. As the ram is lowered, the punch 42 engages the length 10 of bar stock and grips the same between the punch 42 and the elevated anvil 32. As the ram continues to lower, the internally tapered end of the sleeve 41 along with the punch 42 engage the upper end of the length of bar stock 10 and depresses the length 10 of bar stock into the recess 28B in the die 28 and the anvil 32 against the anvil block 34 and forms the work piece 12 as illustrated in FIG. 13. After the work piece 12 is so formed, the ram is moved to its upper position and the anvil 32 is elevated by the pin 33 to raise the work piece 12 to the surface 31 where it is transferred to the next station by the transfer means.

The next station which pancakes the work piece 12 into the pancaked configuration of FIG. 3 includes the die structure of FIGS. 14 and 15. Here, a carrier member 45 is secured to the bolster plate 25 and it carries a stationary anvil 46 which abuts an anvil block 47 carried by a ring 48 secured in the carrier 45 by rings 49 and 50. A block 52 backing a ring 55, a die 56 and a die 57 are held in assembled relation by rings 53 and 54, the assembly being slidably mounted in the carrier 45. The upper end of the opening in the die 56 is tapered as illustrated. Upward movement of the assembly is limited by a ring 58 secured to the carrier 45 and downward movement thereof is limited by the block 52 engaging the ring 49. The assembly is urged towards its raised position by compressed air supplied through a duct 59 and by spring assemblies 60. Instead of utilizing spring assemblies 60, the assembly may be urged towards its raised position by pins which in turn are raised by adjustable pressure hydraulic cylinders arranged in the press bed. In its raised position the assembly forms a continuation of the feed surface 31. A sleeve 62 surrounding the stationary anvil 46, is slidably mounted thereon and is slidably mounted within the block 52 and the die 56. The sleeve 62 is moved to its elevated position shown in FIG. 14 through a movable carrier 63 which in turn is raised by pins 64 operated by the knock-out or ejector mechanism in the bed of the press. The air pressure supplied through the passage 59 also tends to maintain the sleeve 62 in its elevated position when it is raised by the pins 64.

The die structure of FIGS. 14 and 15 also includes a block 37 secured to the ram which in turn carries a carrier 67. A punch block 68 and a punch 69 are secured in place in the carrier 67 by a threaded member 70. A pin 71 is slidably mounted in the punch 69 and it is urged downwardly by a pin 72 which is operated by the pneumatically operated pressure mechanism in the ram.

With the ram in its elevated position as illustrated in FIG. 14, the work piece 12 is fed by the transfer means along the transfer surface 31 over the upper end of the elevated sleeve 62. As the ram is lowered, the pin 71 engages the work piece 12 and clamps the same between the pin 71 and the upper end of the sleeve 62. As the ram continues to descend, the punch 69 engages the top of the work piece 12 to move the same downwardly through the die 57 and to move the die containing assembly downwardly to the position illustrated in FIG. 15. Continued downward movement of the ram operates to pancake the work piece 12 into the pancaked form 13 as illustrated in FIG. 15. Upon upward movement of the ram the die containing assembly moves to its upper position wherein its upper surface is in alignment with the transfer surface 31 and the sleeve 62 operated by the pin 64 operates to elevate the pancaked member above the transfer surface 31 so that the pancaked member 13 may be transferred away along the transfer surface 31 to the next die structure. Instead of using the separate pin 71 and punch 69, the movable pin 71 could be increased in diameter to that of the punch 69 so as to act as the punch when it bottoms against punch block 68 in pancaking the work piece. In this event, a sleeve carried by the holder 70 could be utilized for guiding such a punch.

The next die structure is illustrated in FIGS. 16 and 17. It includes a carrier member 75 suitably secured to the bolster plate 25 carried by the bed and arranged within the carrier member 75 in an assembly including an anvil block 76, a ring 77 and a backing ring 78. A die 79 having a taper in the upper end of the opening therethrough is backed by a backing ring 78 and is held in place by a block 80 which in turn is held in place by a ring 81, the upper surface of the block 80 and ring 81 forming the transfer surface 31. A hollow anvil member 82 having slots 83 therein is slidably mounted in the carrier member 75, anvil block 76 and ring 77. The hollow anvil member 82 backs a sleeve 84 which is slidably mounted in the die 79. The hollow anvil member 82 and the sleeve 84 are raised to an upper position as illustrated in FIG. 16 by a pin 85 operated by the knock-out or ejector mechanism in the press bed and they may be maintained in their upper position by compressed air supplied through the passage 86. In its upper position the upper end of the sleeve 84 is in alignment with the transfer surface 31. A chute 87 extends through one of the slots 83 in the hollow anvil member 82 to convey away the small discs 17 which are pierced from the pancaked members 13 as illustrated in FIG. 4. A jet of air supplied by an air duct 88 through the other slot 83 aids in the discharge of the discs 17.

A block 37 carried by the ram carries another block 90 to which is secured a holder 91 for receiving a punch 92, the punch 92 being held in place in the holder 91 by a conventional Richardson lock arrangement 93. A sleeve 94 is slidably mounted about the punch 92 and it is carried by a carrier 95 which in turn is carried by pins 96 operated by the pneumatically operated pressure mechanism in the ram. The pins 96 normally maintain the sleeve 94 extended with respect to the punch 92 as illustrated in FIG. 16.

With the ram in its upper position the transfer mechanism transfers the pancaked member 13 along the transfer surface 31 to a position above the elevated sleeve 84 as illustrated in FIG. 16. As the ram descends, the sleeve 94 engages the pancaked member 13 to clamp it between the sleeve 94 and the sleeve 84. As the ram continues to descend further, the sleeve 94 depresses the pancaked member 13 into the block 80 with the outer disc portion of the pancaked member 13 engaging the upper side of the die 79. Continued downward movement of the ram causes the punch 92 to move downwardly with respect to the sleeve 94 to pierce the small disc 17 from the pancaked member 13 as illustrated in FIG. 17, the small disc 17 falling downwardly through the sleeve 84 and the hollow anvil member 82 onto the chute 87. The end of the punch 92 may be provided with a spring 97 to assist in starting the falling motion of the small disc 17 through the sleeve 84. As the ram is raised, the pin 85 operates through the hollow anvil member 82 and the sleeve 84 to elevate the pierced pancaked member to a position above the transfer surface 31 so that the pieced pancaked member 13 may be transferred away to the next die structure in the press.

The next die structure is illustrated in FIGS. 18 and 19. It includes a carrier member 99 carried by the bolster plate 25 which in turn carries an assembly including an anvil block 100 and a ring 101. A die 104 engages the ring 101 and is held in place by a ring 105 carried by the carrier 99. A hollow anvil member 102 and a sleeve 103 are slidably mounted in the ring 101 and the die 104. The hollow anvil member 102 and the sleeve 103 are raised to an elevated position as illustrated in FIG. 18 by a pin 106 operated by the knock-out or ejector mechanism in the bed and they may be held in their raised position by compressed air supplied through the passage 107. The hollow anvil member 103 is provided with a pair of slots 108, one of the slot 108 receiving a chute 110 and the other slot 108 communicating with an air supply jet 109.

The die structure of FIGS. 18 and 19 also includes a block 37 carried by the ram which in turn carries a block 112 provided with a holder 113. A punch 114 is received within the holder 113 and is held in place therein by a conventional Richardson lock means 115. A sleeve 116 surrounds the punch 114 and is carried by a carrier 117 which in turn is carried by pins 118 operated by the pneumatically operated pressure mechanism in the ram. The pins 118 normally maintain the sleeve 116 in advanced position with respect to the punch 114 as illustrated in FIG. 18.

With the ram in the elevated position as shown in FIG. 18, the pierced pancake member 13 is transferred by the transfer means along the transfer surface 31 over the opening in the sleeve 103, the cylindrical portion of the pierced pancake member 13 dropping into the sleeve 103 when released by the transfer mechanism. As the ram is lowered, the sleeve 116 pinches the outer disc portion of the pierced pancaked member 13 between it and the sleeve 103 and forces the same downwardly into the die 104, this being permitted by the lowering of the sleeve 103 and the hollow anvil member 102. When the sleeve 103 is in its lowered position as illustrated in FIG. 19, the punch 114 continues to descend with respect to the sleeve 116 and operates to sever the cylindrical portion 14 of the pancaked member 13 from the disc portion thereof as illustrated in FIG. 19. The substantially cylindrical sleeve 14 then drops through the sleeve 103 and the hollow anvil member 102 onto the chute 110 for discharge from the press. The air jet formed by air in the passage 109 assists in the discharge of the substantially cylindrical sleeve 14. As the ram is raised, the pin 106 operates through the hollow anvil member 102 and the sleeve 103 to raise the substantially annular washer 20 above the transfer surface 31 so that it may be transferred away from the die structure by the transfer means. To make sure that the substantially annular washer does not stick to the sleeve 116, the sleeve 116 may be provided with springs 119 for releasing the substantially annular washer 20.

The substantially annular washer 20 is transferred from the die structure of FIGS. 18 and 19 to the die structure illustrated in FIGS. 20 and 21. The die structure of FIGS. 20 and 21 includes a carrier member 120 carried by the bolster plate 25. The carrier member 120 carries a backing ring 121 which backs dies 122 and 123, the die 122 having a bevelled inner edge. The dies 122 and 123 are backed by a block 124 which is secured in place on the carrier 120 by a ring 125. The upper surface of the ring 125, block 124 and die 123 form the transfer surface 31. The carrier 120 also contains an anvil block 126 for backing a block 127 and an anvil 128 having an upper annular surface, the block 127 and anvil 128 being secured together and being mounted for vertical movement within the carrier member 120 and the die 122. The anvil 128 is moved to its upper position illustrated in FIG. 20 by a pin 129 operated by a pin 130 which in turn is operated by the knock-out or ejector mechanism in the bed. The anvil 128 and its block 127 may be held in their upper position by compressed air supplied through the passage 131.

The die structure of FIGS. 20 and 21 also includes a block 37 carried by the ram which in turn carries a holder 133. Slidably mounted in the holder 133 is a punch member 134 carrying a punch 136 provided with a centering member 137. The lower end of the punch 136 about the member 137 is provided with a slight chamfer as illustrated at 136A in FIG. 20. The punch member 134 is normally held downwardly against a stop on the holder 133 by a spring assembly 135.

When the ram is raised, the substantially annular washer 20 is transferred by the transfer mechanism over the annular end of the anvil 128 as illustrated in FIG. 20. As the ram is lowered, the centering member 137 on the punch 136 enters the hole in the substantially annular washer 20 to accurately center the same and as the ram continues to lower, the substantially annular washer 20 is moved downwardly in the die 123 by the chamfered end 136A of the punch 136 into engagement with the bevelled inner edge of the die 122. The bevelled inner edge of the die 122 in conjunction with the punch 136 dishes downwardly the substantially annular washer 20 as illustrated in FIG. 21. Following the dishing operation the ram is raised and as the ram is raised, the dished washer 20 is raised by the anvil 128 to a position above the transfer surface 31 where the transfer means then transfers the dished washer 20 to a point of discharge.

The substantially cylindrical sleeve 14 which was separated from the substantially annular washer 20 by the die structure of FIGS. 18 and 19, after being annealed and lubricated as described above, is fed by a feed mechanism to a die structure illustrated in FIGS. 22 and 23. This die structure may be contained in a different mechanical press if desired. Here, the die structure includes a pair of carrier members 140 and 141 secured together and secured to the bolster plate of the press. The carrier member 141 carries a block 142 for backing dies 143 and 145 which are backed by blocks 144 and 146 which in turn are secured in place on the carrier member 141 by a ring 147. The upper end of the opening in the die 143 has a shoulder 143A formed therein and the opening is also provided with a further internal shoulder 143B downwardly therefrom. The carrier member 140 carries an anvil block 150 for backing a second anvil block 152 arranged in the carrier member 141 and a heavy spring 151 operates to maintain the anvil block 152 in an elevated position. An anvil 153 is slidably mounted in the carrier member 141, the block 142 and the die 143 and it is moved to its upper position by a pin 154 operated by a knock-out or ejector mechanism in the bed of the press. The upper end of the anvil 153 carries a sleeve 155. In the upper position of the anvil 153 the upper edge of the sleeve 155 is substantially flush with the upper edge of the die 145. In FIG. 22 the anvil 153 and the sleeve 155 are illustrated in a partially retracted position.

The die structure of FIGS. 22 and 23 also includes a block 156 carried by the ram of the press. A punch block 157, a punch 158 and a punch holder 159 are secured to the block 156 by a carrier member 160 for movement with the ram. A stripper member 162 is slidably mounted on the punch 158 and is carried by a block 163. The block 163 is normally maintained in its upper position against a stop 166 by pins 164 and springs 165 as illustrated in FIG. 22.

With the ram in its upper position as illustrated in FIG. 22 the substantially cylindrical sleeve 14 is fed over the upper surface of the die structure and into the die 145 where it rests on top of the sleeve 155 carried by the movable anvil 153, the sleeve 155 and anvil 153 at this time being in a partially retracted position. As the ram descends, the punch 158 moves downwardly but the carries 163 remains in its upper position. As the punch 158 moves downwardly, the lower end thereof engages the upper end of the substantially cylindrical sleeve 14 and about at the same time the carrier member 160 engages the carrier 163 to move the carrier 163 downwardly as the punch 158 is further moved downwardly. As the punch moves further downwardly in this manner, the substantially cylindrical sleeve 14 is forced downwardly to force the sleeve 155 and the anvil 153 downwardly to cause the substantially cylindrical member 14 to enter the die 143. Upon further movement of the punch 158 downwardly the upper portion of the substantially cylindrical member 14 is extruded outwardly about the shoulder 143A in the die 143 into the chamber of the die 145 by the shoulder 167 on the punch 158 which also confines this outward extrusion as indicated in FIG. 23. At the bottom of the stroke of the ram the anvil 153 abuts the anvil block 152 to assure this outward extrusion. The outer shoulder 143B in the die 143 forms the annular recess in the lower end of the substantially cylindrical sleeve 14. The anvil block 152 is spring loaded by the spring 151 so that if there should be excessive material in the substantially cylindrical sleeve 14, the anvil 152 can move downward against this spring pressure to prevent undue stressing of the die structure. After the formation of the inner race 14 of the bearing in this manner, the ram moves on its up stroke and the sleeve 155 and the anvil 153 are raised by the pin 154 to elevate the inner race 14 to a point above the upper edge of the die 145. Should the inner race 14 tend to adhere to the reduced portion of the punch 158 on such upward motion of the ram, the stripper member 162 will strip the inner race 14 from the punch 158 when the carrier 163 engages the stop 166. Suitable transfer means is provided for discharging the inner race 14 at the time that a new substantially cylindrical member 14 is fed to the die structure.

The substantially annular washer 20 which has been dished, annealed and lubricated is inverted and fed to a die structure as illustrated in FIGS. 24 to 28. This die structure may be included in a separate press having feeding means for supplying the inverted substantially annular washer 20 thereto. The die structure includes a carrier 170 carried by the bolster plate of the press and it includes an annular anvil 171 and a die 172 held in place by a block 173 which in turn is held in place by a ring 174. The ring 174 is also provided with a die member 175 for guiding and receiving the dished and inverted substantially annular washer 20 fed thereto. An ejector member 176 is slidably received in the die 172 and the anvil 171 and it is moved upwardly to a point where it is substantially flush with the top surface of the ring 174 by a pin 177 operated by the knock-out or ejector mechanism in the bed of the press. In FIG. 24 the ejector member 176 is shown to be partially depressed. The pin 177 carries a bracket 178 which is normally urged downwardly by a spring 179, the downward movement of the bracket 178 and the pin 177 being limited by a stop 180. The die structure also includes block 182 carried by the ram. A punch 183 and a sleeve therearound are secured in a carrier 185 suitably secured to the block 182. Slidably mounted in the carrier 185 is a carrier 186 for operating a sleeve 187 surrounding the punch 183. A ring 188 secures with a small lost motion the sleeve 187 in the carrier 186. A ring 189 carried by the carrier 185 limits the downward motion of the carrier 186 with respect to the carrier 185. Pins 190 operated by a pneumatically operated pressure mechanism in the ram normally urges the carrier 186 downwardly with respect to the carrier 185.

Referring more particularly to FIGS. 26 to 28 the die 172 is provided with a conical taper 192 for receiving the edge of the dished substantially annular washer 20. It also includes a cylindrical portion 193, a conical tapered portion 194 and a cylindrical portion 195 merging with each other. The punch 183 has a cylindrical portion 196 of relatively small diameter, a shoulder 197, a curved portion 198 and a cylindrical portion 199 merging with each other.

With the parts of the die structure in the position illustrated in FIG. 24 where the ram is raised, a dished and inverted substantially annular washer 20 is fed by a feed mechanism into the die 175 where it rests upon the knock-out member 176 and the conically tapered surface 192 of the die 172. As the ram is lowered, the small diameter portion 196 of the punch 183 enters the central opening of the substantially annular washer 20 and the knock-out member 176 is permitted to lower to its lowest position. At this time the sleeve 187 engages the substantially annular washer 20 to hold it against the die 172 and the shoulder 197 on the punch 183 engages the inner margin of the dished substantially annular washer firstly to tend to flatten the same as shown in FIG. 26. Further downward movement of the punch 183 causes the annular washer 20 to be extruded by the curved portion 198 of the punch into a substantially cylindrical sleeve 20B against the cylindrical wall 193 of the die 172. Continued forward motion of the punch 183 as illustrated in FIG. 27 completes the formation of the substantially cylindrical sleeve 20B. As this is being done, the punch 183 advances with respect to the sleeve 187 against the pneumatic pressure afforded by the pins 190. When the parts are in the position shown in FIG. 27 the sleeve 184 about the punch 183 engages the sleeve 187 about the punch 183 to force the latter downwardly along with the punch 183 and as a result, the substantially cylindrical sleeve 20B of FIG. 27 is extruded into a substantially frusto-conical sleeve 21 as shown in FIGS. 25 and 28.

Following this extrusion the ram is then raised and also the ejector member 176 is raised to a point where its top edge is even with the top edge of the ring 174 for ejecting the substantially frusto-conical member 21 from the die 172. In the event that the substantially frusto-conical member 21 should adhere to the punch 183, the carrier 186 and the sleeve 187 carried thereby are moved with respect to the punch 183 by the pins 190 to strip the substantially frusto-conical member 21 from the punch 183. A suitable means for removing the frusto-conical member 21 from the die structure is provided following this ejection and/or stripping operation.

The frusto-conical member 21 formed by the die structure of FIGS. 24 to 28 is then inverted and fed to the die structure illustrated in FIGS. 29 and 30. This latter die structure may be incorporated in a different press or it may be incorporated in the same press. The die structure of FIGS. 29 and 30 includes a carrier member 201 carried by the bolster plate of the press. The carrier member 201 carries an anvil block 202, a sleeve 203 and a die 204, these parts being held in assembled relation on the carrier member 201 by a ring 205. Slidably mounted in the die 204 and the ring 203 is an ejector member 206 which is carried by a pin 207 operated by the knock-out or ejector mechanism located in the bed of the press. The pin 207 carries a bracket 208 which is urged downwardly by springs 209 toward stops 210. The ejector 206 is movable between the upper position where its upper edge is substantially level with the upper face of the die 204 and a lower position as illustrated in FIG. 30. In FIG. 29, the ejector member 206 is partially depressed.

The die structure of FIGS. 29 and 39 also includes a block 212 carried by the ram. A punch 213 provided with a punch block is secured within a carrier 215 mounted on the block 212. The lower end of the punch 213 is provided with a conically tapered end portion 214. Slidably mounted in the carrier 215 is a carriage 216 for a sleeve 217 arranged around the punch 213, the sleeve 217 being secured to the carriage 216 by a ring 218. The carriage 216 is held within the carrier member 215 by a ring 219 which also acts as a stop for downward movement of the carriage 216. The carriage 216 is normally urged downwardly against the stop 219 by pins 220 operated by a pneumatically operated pressure mechanism in the ram. The carriage 216 is provided with a projection 221 which is adapted to seat in a seat 222 on the upper surface of the ring 205.

With the parts in the position illustrated in FIG. 29 an inverted frusto-conical sleeve 21 is fed by a feeding means into the opening in the die 204 onto the ejector member 206 which is then in a partially depressed position. As the ram moves downwardly, the conically tapered end 214 of the punch moves inside of the frusto-conical sleeve 21 to move it and the ejector mechanism 206 downwardly into the lower portion of the cavity in the die 204. When this occurs, the projection 221 on the carrier 216 engages the seat 222 to prevent further downward movement of the sleeve 217 and the continued movement of the punch 213 forms the frusto-conical sleeve 21 into the outer bearing race 22 as illustrated in FIG. 30.

As the ram is raised, the sleeve 217 operates to strip the outer race 22 from the punch 213 and the ejector member 206 following the punch operates to eject the outer race 22 from the cavity in the die 204. The ejector member 206 is elevated to a point where its upper edge is even with the top surface of the ring 205 so that the extruded outer race 22 may be transferred from the die structure by a suitable discharging device.

While for purposes of illustration one form of this invention has been disclosed, other forms thereof may become apparent to those skilled in the art upon reference to this disclosure and, accordingly, this invention is limited only by the scope of the appended claims.

What I claim is:

1. The method of extruding inner and outer races for a roller bearing from cylindrical bar stock comprising the steps of providing a length of cylindrical bar stock, pancaking said length of cylindrical bar stock into a substantially circular disc portion having substantially flat sides and having a substantially cylindrical sleeve portion of lesser diameter extending from one of the substantially flat sides thereof, centrally piercing said substantially circular disc portion and separating said substantially cylindrical sleeve portion from said substantially circular disc portion to form a substantially cylindrical sleeve and a substantially flat annular washer, extruding said substantially cylindrical sleeve into the inner race for the roller bearing, and extruding said substantially flat annular washer into the outer race for the roller bearing.

2. The method of extruding inner and outer races for a roller bearing as defined in claim 1 including the steps of shearing said length of cylindrical bar stock from elongated cylindrical bar stock, and longitudinally upsetting and squaring said length of cylindrical bar stock before pancaking the same.

3. The method of extruding inner and outer races for a roller bearing as defined in claim 1 wherein said step of centrally piercing said substantially circular disc portion and separating said substantially cylindrical sleeve portion from said substantially circular disc portion comprises, first piercing said substantially circular disc portion at the inner confines of said substantially cylindrical sleeve portion, and then separating said substantially cylindrical sleeve portion from said substantially circular disc portion at the outer confines of said substantially cylindrical sleeve portion.

4. The method of extruding inner and outer races for a roller bearing as defined in claim 1 wherein said step of extruding said substantially flat annular washer into the outer race for the roller bearing comprises first preforming said substantially flat annular washer into a substantially frusto-conical sleeve, and then extruding said substantially frusto-conical sleeve into the outer race for the bearing.

5. The method of extruding inner and outer races for a roller bearing from cylindrical bar stock having a grain structure including grain boundaries extending longitudinally thereof comprising the steps of providing a predetermined length of said cylindrical bar stock, pancaking said length of cylindrical bar stock into a substantially circular disc portion having substantially flat sides and having a substantially cylindrical sleeve portion of lesser diameter extending from one of the substantially flat sides thereof wherein the grain boundaries of the grain structure adjacent said one side of the outer portion of the substantially circular disc portion are substantially parallel to said one side and wherein the grain boundaries of the grain structure adjacent the outer side of the substantially cylindrical sleeve portion are substantially parallel to said outer side, centrally piercing said substantially circular disc portion and separating said substantially cylindrical sleeve portion from said substantially circular disc portion to form a substantially cylindrical sleeve having the grain boundaries of the grain structure adjacent the outer side thereof substantially parallel to said outer side and to form a substantially flat annular washer having the grain boundaries of the grain structure adjacent said one side thereof substantially parallel to said one side, extruding said substantially cylindrical sleeve into the inner race for the roller bearing with said outside of said substantially cylindrical sleeve providing for the outer bearing surface thereof and with the grain boundaries of the grain structure adjacent thereto being substantially parallel thereto, and extruding said substantially flat annular washer into the outer race of the roller bearing with said one side of said substantially flat annular washer providing for the inner bearing surface thereof and with the grain boundaries of the grain structure adjacent thereto being substantially parallel thereto.

6. The method of extruding inner and outer races for a roller bearing as defined in claim 5 including the steps of shearing said length of cylindrical bar stock from elongated cylindrical bar stock, and longitudinally upsetting and squaring said length of cylindrical bar stock before pancaking the same.

7. The method of extruding inner and outer races for a roller bearing as defined in claim 5 wherein said step of centrally piercing said substantially circular disc portion and separating said substantially cylindrical sleeve portion from said substantially circular disc portion comprises, first piercing said substantially circular disc portion at the inner confines of said substantially cylindrical sleeve portion, and then separating said substantially cylindrical sleeve portion from said substantially circular disc portion at the outer confines of said substantially cylindrical sleeve portion.

8. The method of extruding inner and outer races for a roller bearing as defined in claim 5 wherein said step of extruding said substantially flat annular washer into the outer race for the roller bearing comprises, first preforming said substantially flat annular washer into a substantially frusto-conical sleeve with said one side of said substantially flat annular washer forming the inner surface of said substantially frusto-conical sleeve and with the grain boundaries of the grain structure adjacent said inner surface substantially parallel thereto, and then extruding said substantially frusto-conical sleeve into the outer race for the bearing with the inner face of said frusto-conical sleeve providing for the inner bearing surface thereof.

9. Apparatus for extruding inner and outer races for a roller bearing from a length of cylindrical bar stock comprising, means for pancaking said length of cylindrical bar stock into a substantially circular disc portion having substantially flat sides and having a substantially cylindrical sleeve portion of lesser diameter extending from one of the substantially flat sides thereof, means for centrally piercing said substantially disc portion and separating said substantially cylindrical sleeve portion from said substantially circular disc portion to form a substantially flat cylindrical sleeve and a substantially annular washer, means for extruding said substantially cylindrical sleeve into the inner race for the roller bearing, and means for extruding said substantially flat annular washer into the outer race for the roller bearing.

10. Apparatus for extruding inner and outer races for a roller bearing as defined in claim 9 including means for upsetting and squaring the length of cylindrical bar stock.

11. Apparatus for extruding inner and outer races for a roller bearing as defined in claim 9 wherein said means for centrally piercing said substantially circular disc portion and separating said substantially cylindrical sleeve portion from said substantially circular disc portion comprises, means for piercing said substantially circular disc portion at the inner confines of said substantially cylindrical sleeve portion, and means for separating said substantially cylindrical sleeve portion from said substantially circular disc portion at the outer confines of said substantially cylindrical sleeve portion.

12. Apparatus for extruding inner and outer races for a roller bearing as defined in claim 9 wherein said means for extruding said substantially flat annular washer into the outer race for the roller bearing comprises, means for preforming said substantially flat annular washer into a substantially frusto-conical sleeve, and means for extruding said substantially frusto-conical sleeve into the outer race for the bearing.

References Cited

UNITED STATES PATENTS

| 1,366,026 | 1/1921 | Rydbeck | 308—193 |
| 1,387,638 | 8/1921 | Bingham | 29—148.4 |
| 1,971,083 | 8/1934 | Im Schlaa | 29—148.4 |
| 2,613,429 | 10/1952 | Dierbeck | 29—148.4 |
| 2,913,811 | 11/1959 | Benson | 29—148.4 |
| 3,378,903 | 4/1968 | Cardillo | 29—148.4 |

THOMAS H. EAGER, Primary Examiner

U.S. Cl. X.R.

29—149.5; 308—212